United States Patent
Barmore

(10) Patent No.: US 7,115,816 B2
(45) Date of Patent: Oct. 3, 2006

(54) PLASTIC ANCHORING AND MOUNTING DEVICE FOR WIRES AND CABLES

(76) Inventor: Thomas C. Barmore, 4 N. 127 Verrill, Addison, IL (US) 60101

( * ) Notice: Subject to any disclaimer, the term of this patent is extended or adjusted under 35 U.S.C. 154(b) by 0 days.

(21) Appl. No.: 10/769,004

(22) Filed: Feb. 2, 2004

(65) Prior Publication Data
US 2005/0167152 A1    Aug. 4, 2005

(51) Int. Cl.
*F16L 3/137* (2006.01)

(52) U.S. Cl. .................. 174/135; 24/16 PB; 24/458; 248/74.3

(58) Field of Classification Search ............... 174/135; 24/16 PB, 458; 248/56, 71, 74.3
See application file for complete search history.

(56) References Cited

U.S. PATENT DOCUMENTS

| | | | | |
|---|---|---|---|---|
| 3,269,680 A * | 8/1966 | Bryant | ...................... | 248/74.3 |
| 4,705,245 A * | 11/1987 | Osada | ...................... | 248/74.3 |
| 5,112,013 A * | 5/1992 | Tolbert et al. | ............ | 248/74.3 |
| 6,222,128 B1 * | 4/2001 | Gretz | ......................... | 174/135 |
| 6,247,591 B1 * | 6/2001 | Grendol | ................... | 24/16 PB |
| 6,443,403 B1 * | 9/2002 | Page et al. | ............... | 24/16 PB |
| 6,749,157 B1 * | 6/2004 | Takeuchi | .................. | 248/74.3 |
| 6,764,050 B1 * | 7/2004 | Takenaga | ................. | 24/16 PB |

* cited by examiner

*Primary Examiner*—Dean A. Reichard
*Assistant Examiner*—Adolfo Nino
(74) *Attorney, Agent, or Firm*—Patnaude & Videbeck

(57) ABSTRACT

A pair of elongated, thin, flexible, plastic strips capable of being secured together linearly, around an object to be anchored, such as a bundle of wires, or pipe. One of the strips has means for securing the device to a panel such as a wall.

4 Claims, 4 Drawing Sheets

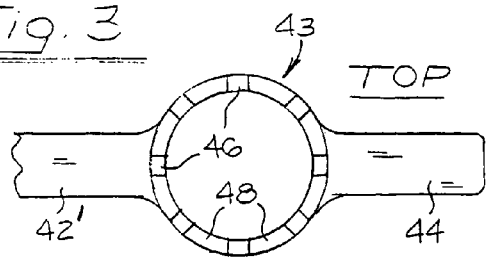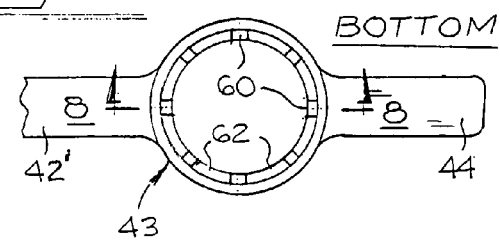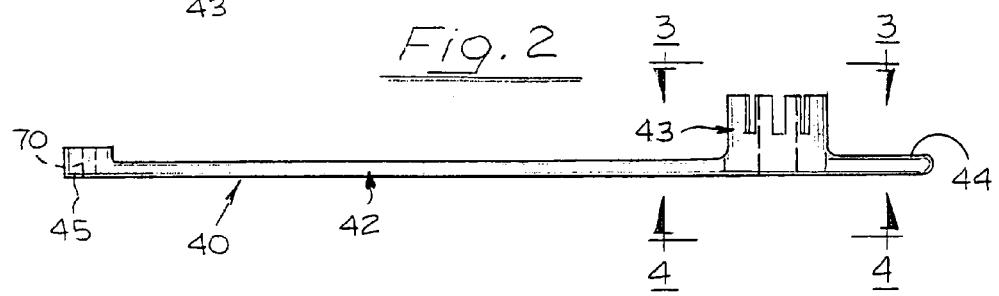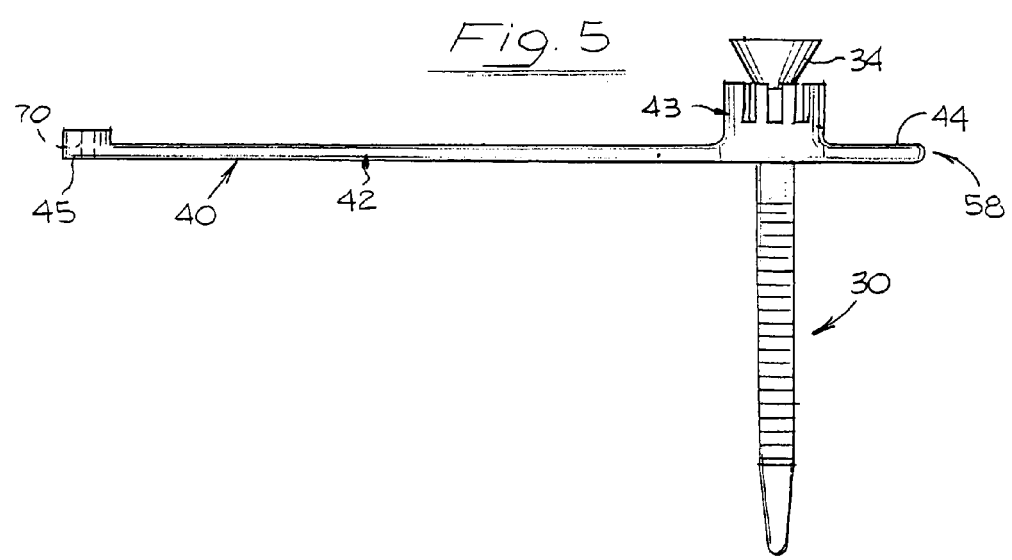

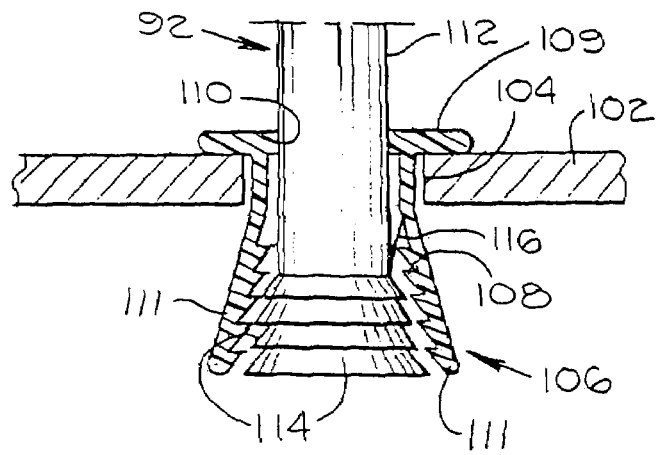
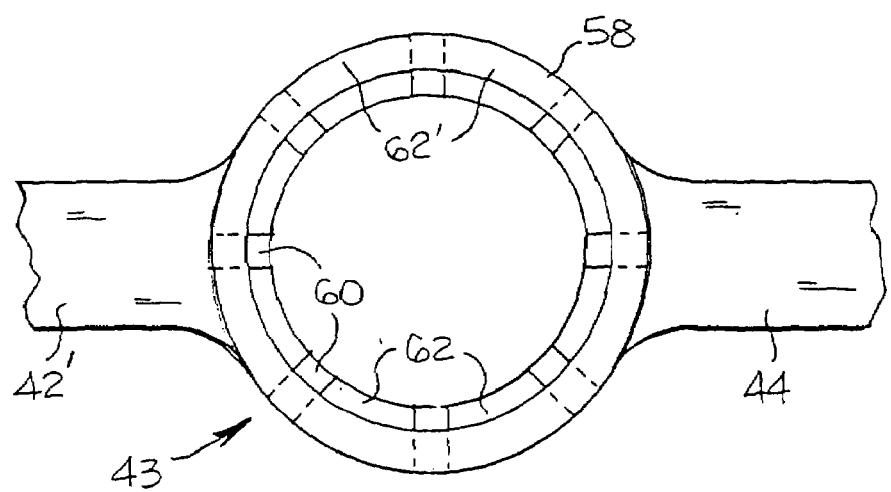

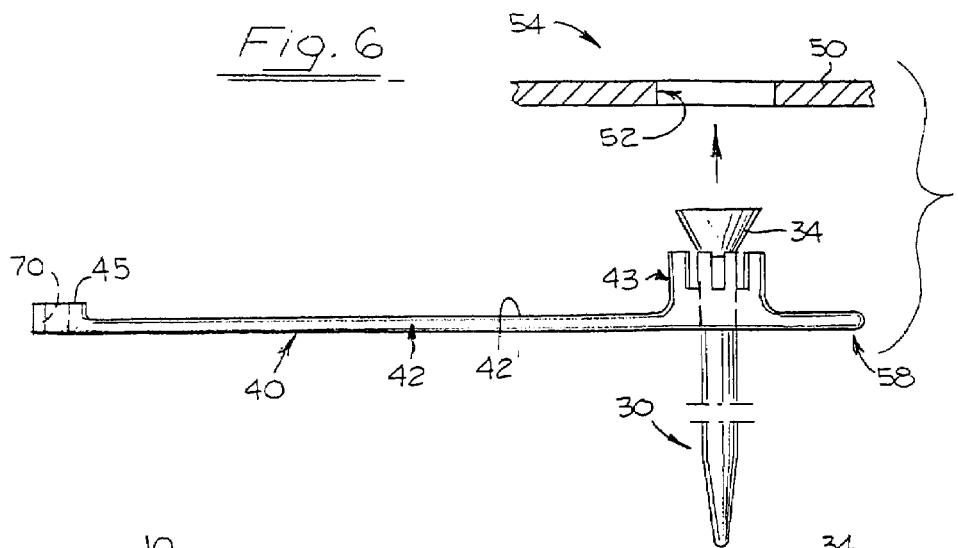
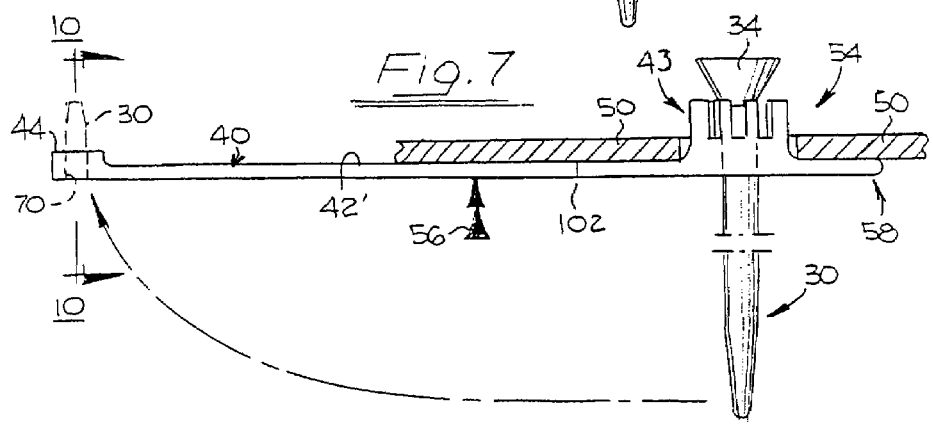
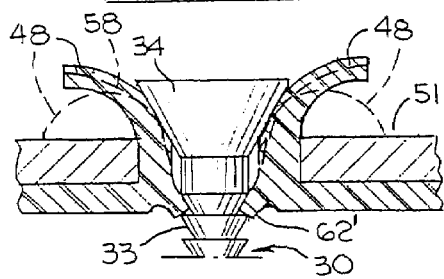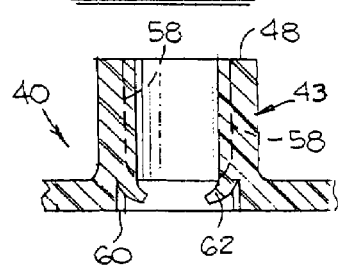

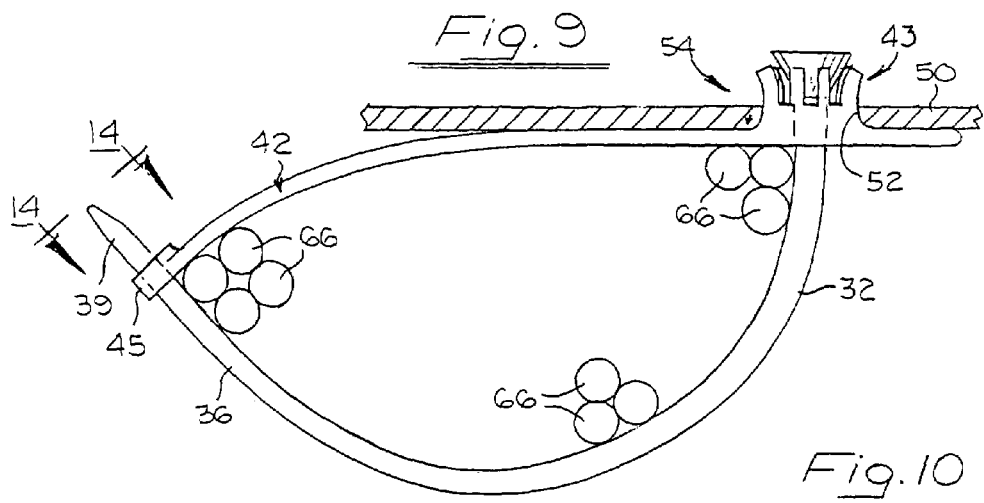
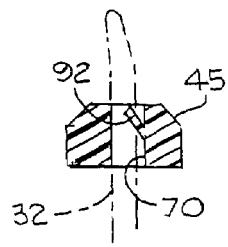
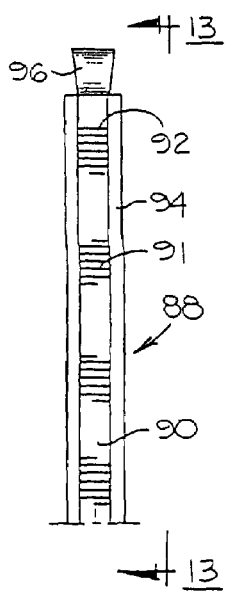
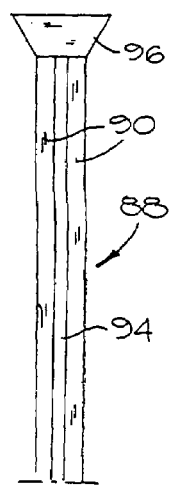
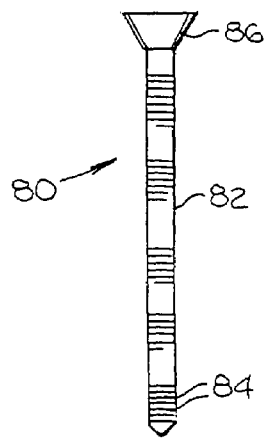
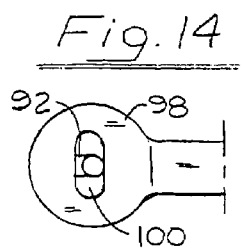

US 7,115,816 B2

PLASTIC ANCHORING AND MOUNTING DEVICE FOR WIRES AND CABLES

FIELD OF THE INVENTION

The invention resides in the general field of mounting wires and cables on a wall and running them along the wall between spaced connector points on the wall.

OBJECTS OF THE INVENTION

The objects of the invention are to provide such an anchoring device that possesses advantages as follows:
1. It is made up entirely of plastic pieces.
2. There are no metal elements included in the device.
3. The plastic pieces are interconnected for securing the device around the wires or objects to be mounted.
4. The interconnecting steps are performed by the insertion of an elongated element on one of the pieces through an opening in the other piece, and drawing them tight around the wires.
5. The binding and securement effect between the pieces of plastic is accomplished by wedging action between certain elements of the pieces.

SUMMARY OF THE INVENTION

The invention resides in a cable anchoring device for anchoring a cable on a wall. The device comprises a first tie member, a first head on a first end thereof and a bare second end. A second tie member having a second head on a first end thereof. A first head on said second tie member is placed in a first hole in a wall element and projected through that hole. The first head has a second hole therethrough. The second tie member has a second head on its second end and the second head has a hole therethrough.

BRIEF DESCRIPTION OF THE DRAWINGS

FIG. 1 is a side view of one of the two pieces of the device.

FIG. 2 is a side view of the other one of the two pieces of the device.

FIG. 3 is a top view taken at line 3—3 of FIG. 2.

FIG. 3A is similar to FIG. 4, but on a larger scale and including an additional element.

FIG. 4 is a bottom view taken at line 4—4 of FIG. 2.

FIG. 5 is a view of the two pieces assembled i.e., the piece of FIG. 1 is inserted through the piece of FIG. 2.

FIG. 6 is a view of the assembled pieces as oriented in FIG. 5 in association with a segment of a wall.

FIG. 7 is a view oriented according to FIG. 6 but showing the assembled pieces fitted to the wall segment and indicating how their extended ends are to be interlocked.

FIG. 8 is a sectional view taken at line 8—8 of FIG. 4.

FIG. 8A is a view oriented according to FIG. 8 but with the "first" piece positioned therein and partially pulled into locking position.

FIG. 9 is a view of a device in finally installed position encompassing a bundle of wires.

FIG. 10 is a sectional view taken at line 10—10 of FIG. 7.

FIG. 11 is a face view of the strip of an alternate form of the "first" piece.

FIG. 12 is a view similar to FIG. 11 of another form of the device.

FIG. 13 is a view taken at line 13—13 of FIG. 12.

FIG. 14 is a view taken at line 14—14 of FIG. 9.

FIG. 15 is a sectional view of still another form of device.

DETAILED DESCRIPTION OF THE PREFERRED EMBODIMENT

FIG. 1 shows a first one of the two pieces making up the entire device. The piece of FIG. 1, identified as 30, includes a strip 32, which may also be referred to as the body of the piece. The piece at its upper end 31, (FIG. 1) includes a wedge element 34, which may be referred to as a heard, and its lower end 38, which may also be referred to as its leading end, is tapered. As noted above the entire item is composed of plastic and is a single, integrated one-piece item.

In the form of FIG. 1, the piece 30 may be of any of a plurality of different shapes and forms, but in the present case, the wedge element 34 may be round, or conical. The strip 32 is flat and relatively thin, with grooves and notches 33 having prongs 35 near the top thereof for retaining the piece in mounted position as referred to below, and cross ribs 36 for interlocking it with the other piece. These ribs are distributed along the strip from an upper point 37 below the grooves 33 to a lower point 38 near the lower end, and the tapered lower end 39 may be smooth.

Reference is now made to the second piece, identified 40, in FIG. 2. This piece includes a body or relatively thin flat strip 42 having a top surface 42' and a first head 43 at a first end 44 and a second head 45 at its other and second end. Each of the pieces 30, 40 is independently molded and there are no elements of non-plastic character utilized in either of the pieces. It is not necessary for the user to cut any openings in the device in applying it to its position of use, or in its functioning in holding the wires or cables. The first head 43 (FIG. 3) is cylindrical and hollow and extends in one direction from the body or strip 42 (FIG. 5) in this case upwardly.

The first head 43 is provided with a series of radial notches or cuts 46—46 such as seven or eight or more in number, forming a corresponding number of fingers 48—48 in the peripheral wall of the cylinder. In using the device, the operator inserts the stem 32 of the first piece into and through the first head 43 (FIG. 2) to the position of FIG. 5. At this position the wedge 34, or head does not enter into the cylindrical first head 43, but does so at a later step as described below. In a first step, the first piece 30 is moved only down to the position of FIG. 5 in which the wedge element engages only the upper ends of the fingers 48—48. As a next step, the assembly of the two pieces as shown in FIG. 5 is positioned for inserting into a wall 50 as shown in FIG. 6. A hole 52 is first drilled in the wall at what is conveniently referred to as a mounting position or mounting station 54 (FIG. 7). This hole is cut through the wall to a convenient distance for mounting the device on the wall. It may be partially through, or entirely through, the wall, as desired.

The wall element 50 may also be referred to as a panel, since the device is well adapted to mounting wires, cables, etc. in any of the various places. A wall may be a most common example in which the device is utilized, but it is also well adapted for use in connection with a panel. A panel may be in any of various positions, whereas a wall is usually vertical, and a point is made of the fact that the device is easily usable in any position of the panel.

Following the foregoing, the assembly of the two pieces connected as in FIG. 5, and identified 58 is positioned relative to the wall or panel, as represented in FIG. 6 and then it is moved toward the wall, and the first head 42, with the wedge 34 as a unit, is inserted through the hole 52 (FIG. 7) to a position in which the body or the strip 42 of the piece 40 engages flat against the wall. Thereafter, in the use of the device, constant pressure is imposed against the second piece as represented by the arrow 56, in FIG. 7. At this point, the strip 30 (FIG. 7) is pulled downwardly, while the pressure is maintained according to the arrow 56. The strip may be pulled by gripping it by the hand or by a pair of pliers, and as it is pulled down, the head or wedge 34 is pulled into the cylindrical first head 43 as shown in FIG. 8A. In this step, the wedge 34 spreads the fingers 48—48 radially and they are bent so that the ends thereof engage the wall 51.

This engagement by the fingers with the wall prevents the first piece from being pulled entirely through the cylindrical head.

The head 43 is provided with a counterbore 58 (see FIGS. 8, 8A). This counterbore extends from the inner (or upper) end of the tubular fingers 48 to a position above the top surface 42'. As the wedge 34 enters into the head 43, that is, into the space between the fingers, and as it spreads the fingers, the inner and thinner portions of the fingers provided by the counterbore facilitates the flexing of the fingers 48—48 outwardly.

The positions of the fingers pursuant to such flexing is shown at 62' in FIG. 8A.

The fingers 48 do not lose their resiliency, and they tend to move back to their original cylindrical position, or as stated in another way, and as viewed in FIG. 8A, their outer ends tend to move upwardly and urge the entire first piece 30 upwardly. As long as pressure or tension is applied to the first piece in pulling it down, the relationship between the various members and elements remains in proper condition, but after that pulling effect is released from the first piece 30, if the first piece were not held positively in a downward position, it would be urged upwardly by the reverse movement of the fingers 48—48.

The fingers 48 (FIG. 3) are so dimensioned and located as to be responsive well to the wedge whether the latter is round, or polygonal.

An important feature of the present invention is to prevent any reverse movement of the fingers 48—48 or of the entire piece 30. For this purpose, the first head 43 at its lower end (FIG. 4) is provided with a series of notches 60—60 in the wall thereof leaving a corresponding number of prongs 62—62. These prongs and notches are shown in FIG. 8.

Correspondingly, the grooves 33—33 (FIG. 1) are positioned at an axial distance from the wedge 34 as to engage the prongs 62—62 in the second head 42 (FIG. 8A). The prongs 62—62 similarly to other elements of the device, possess a certain degree of resilience or springiness, and the grooves 33—33 engage these prongs 62—62 to prevent the first piece from being withdrawn from the second head. More specifically, as the fingers 48 tend to resume their original position they urge the first piece upwardly, as stated above, and a friction and holding effect is established between the prongs 62—62 and the groove top surface 35 to prevent the first piece from being moved objectionably upwardly.

Thus the first piece can be easily and quickly drawn into its final position manually, and it is held in that position, from going further inwardly beyond the fingers 48—48 and prevented from being withdrawn reversely by the groove top surfaces 35—35 and prongs 62—62 (FIG. 8A).

As a next step in using the device, the user grasps the strip 42 (FIG. 9) and plies it against a bundle of wires 66, and then draws up the strip 32 around the wires with the leading end 38 directed up to the second head 45 and inserts it through a hole 70 in the second head 45 (FIG. 9).

If the strip 32 is round, the hole 70 may be provided with a single spur 92 (FIGS. 10 and 14) which grips into the body of the strip 32 and holds it there against any force tending to withdraw it. This drawing up and tying is increased, or intensified until all of the wires are so tied.

This constitutes tying or anchoring the wires in a desired location, and then the user may go to a next station or location to install another tie.

Other shapes which the strip 32 may assume, are represented in FIGS. 11–13.

These latter figures represent "first" pieces as identified above, that are non-circular.

The piece 80 of FIG. 11 has a body 82 that is thin and flat, and has transverse ribs 84 for facilitating gripping it and holding it in place. The wedge 86 thereon may be round or polygonal.

In FIGS. 12 and 13, the piece 88 has a central body portion 90 of relatively greater thickness with transverse ribs 91, and side longitudinal ribs 94. The wedge 96 is preferably polygonal.

FIG. 14 shows a head 98 corresponding to the head 45 but having an opening 100 shaped for receiving the strip 88 of FIGS. 12 and 13.

While the proportions of the various elements as shown and described hereinabove, constitute a preferred use of the device, it is also possible to use it as a rivet. Referring to FIG. 7 for example, when the second piece is applied to the wall, it may be cut at the line 102 (FIG. 7) and the excess material (at the left) discarded leaving the anchoring effect in a single circular area slightly larger than the first head 42.

The various pieces, elements, parts, are all very simple and can be predesigned to accommodated substantially any kids and shapes of the pieces. FIG. 15 shows another simple form that the device may assume. In this case, the device, indicated in its entirety positioned at a wall 102 and having a hole 104 therein. The device includes an outer bell-shaped tubular element 106 with circumferential teeth or locking ribs 108. The element 106 at its inner end includes a plate 109 having its outer periphery engaging the wall element. This plate has a hole 110 for the insertion therethrough of a strip 112 corresponding to the strip 32 of the first form (FIG. 1).

The strip 112 at its lower end includes circumferential ribs or teeth 114 engageable with the teeth 108 to prevent withdrawal of the strip 92 upwardly.

The element 106 has circumferentially spaced, longitudinal gaps 116 (FIG. 15) to enable the parts 111 between the gaps to be sprung radially outwardly upon insertion of the strip 112.

I claim:

1. A cable anchoring device for anchoring a cable on a wall, comprising, a first tie member, a first head on a first end thereof and having a bare second end, a second tie member having a first head on a first end thereof, a first head of said second tie member placed in a first hole in a wall and projected through that hole and said first head capable of being secured to the wall and having a first hole therethrough, the second tie member having a second head on its second end, and the second head having a second hole therethrough, the first head on the first tie member includes a cylindrical portion having a plurality of circumferentially spaced fingers extending longitudinally and capable of being spread radially outwardly into locking engagement with a wall, the second tie member having means for engaging said fingers for so spreading them, said cylindrical portion is hollow, the first tie member having a wedge shape first end, and its second end being capable of being inserted through the cylindrical portion and thereby through the first head on the second tie member, and in response to pulling the first tie member with its second end leading, the wedge shape first end is operable for actuating the spaced fingers, said anchoring device being for use with a panel having a front surface and a rear surface, and a hole therethrough perpendicular to those surfaces, the second tie member having a plate portion fitting against the front surface and limiting movement of the first head in insertion into the hole, the cylindrical portion having radially inwardly extending first gripping prongs longitudinally adjacent the inner surface of the panel, the first member having gripping grooves spaced longitudinally from the wedge end and positioned for operably engaging the first gripping prongs and thereby restraining movement of the first tie member in outward direction through the first hole in the second member, the portion of the first tie member other than the wedge has a length indefinitely greater than its circumference, the second head on the second tie member has a second hole therethrough, and the second end of the first tie member is capable of being inserted through the second hole, the inner surface of the second hole and the first tie member have interchangeable elements to retain the first tie member in drawn up position relative to the second head, said interchangeable elements include a protruding flexible finger on one side of the second hole, and that finger is spaced from the opposite side of the second hole a distance less than the thickness of the second tie member in corresponding direction.

2. An anchoring device according to claim 1 wherein the first tie member has transverse ribs on its side engageable by said flexible finger.

3. A cable anchoring device for anchoring a cable on a wall, comprising, a first tie member, a first head on a first end thereof and having a bare second end, a second tie member having a first head on a first end thereof, said first head on said second tie member placed in a first hole in a wall and projected through that hole and said first head capable of being secured to the wall and having a first hole therethrough, the second tie member having a second head on its second end, the second head having a hole therethrough, the first head on the second tie member includes a cylindrical portion having a plurality of circumferentially spaced fingers extending longitudinally and capable of being spread radially outwardly into locking engagement with the wall, the first tie member having means for engaging said spaced fingers for so spreading them, the spaced fingers and a plurality of prongs together, have common axis annular counterbores, the first counterbore leading from the free ends of the fingers inwardly to a position adjacent to but spaced from the second counterbore leading inwardly from the free ends of said prongs.

4. An anchoring device according to claim 3, wherein the fingers and prongs are so constructed and arranged that the prongs enter into the counterbore when they reach a common diameter with the counterbore.

* * * * *